US010402976B2

(12) United States Patent
Dutta et al.

(10) Patent No.: US 10,402,976 B2
(45) Date of Patent: Sep. 3, 2019

(54) ISOLATION OF ANEURYSM AND PARENT VESSEL IN VOLUMETRIC IMAGE DATA

(71) Applicant: Siemens Healthcare GmbH, Erlangen (DE)

(72) Inventors: Komal Dutta, Palatine, IL (US); Scott Baker, Stevensville, MI (US)

(73) Assignee: Siemens Healthcare GmbH, Erlangen (DE)

( * ) Notice: Subject to any disclaimer, the term of this patent is extended or adjusted under 35 U.S.C. 154(b) by 192 days.

(21) Appl. No.: 15/597,026

(22) Filed: May 16, 2017

(65) Prior Publication Data

US 2018/0336676 A1 Nov. 22, 2018

(51) Int. Cl.
| G06K 9/00 | (2006.01) |
| G06T 7/11 | (2017.01) |
| G06T 11/60 | (2006.01) |
| G06T 7/187 | (2017.01) |
| G06T 7/194 | (2017.01) |

(52) U.S. Cl.
CPC .............. *G06T 7/11* (2017.01); *G06T 7/187* (2017.01); *G06T 7/194* (2017.01); *G06T 11/60* (2013.01); *G06T 2207/10116* (2013.01); *G06T 2207/30101* (2013.01); *G06T 2210/12* (2013.01); *G06T 2211/404* (2013.01)

(58) Field of Classification Search
None
See application file for complete search history.

(56) References Cited

U.S. PATENT DOCUMENTS

| 2005/0111732 | A1* | 5/2005 | Mallya | A61B 6/00 |
| | | | | 382/173 |
| 2011/0206257 | A1* | 8/2011 | Qanadli | A61B 5/02014 |
| | | | | 382/130 |
| 2015/0317442 | A1* | 11/2015 | Baloch | G06F 19/321 |
| | | | | 706/12 |

OTHER PUBLICATIONS

Vikravanshalmani Alireza, et al., "Segmentation and Separation of Cerebral Aneurysms: A multi-phase approach", 2013 8th International Symposium on Image and Signal Processing and Analysis (ISPA), University of Trieste and University of Zagreb, Sep. 4, 2013, pp. 505-510.
Search Report for Corresponding European Application No. 18171871.0, dated Sep. 20, 2018.
Azadek Firouzian, et al., "Intracranial aneurysm segmentation in 3D CT angiography: Method and quantitative validation with and without prior noise filtering", European Journal of Radiology, Elsevier Science, NL, vol. 79, no. 2, Feb. 17, 2010, pp. 299-304.
Bernd F. Tomandl, et al, "CT Angiography of Intracranial Aneurysms: A Focus on Postprocesing", Radiographics, vol. 24, No. 3, May 1, 2004, pp. 637-655.

(Continued)

*Primary Examiner* — Wei Wen Yang

(57) ABSTRACT

A framework for isolating an aneurysm and parent vessel in volumetric image data is provided herein. In accordance with one aspect, the framework generates a refined mask by performing region growing starting at an aneurysm dome point to eliminate vessels that are indirectly connected to an aneurysm or parent vessel in volumetric image data. A final mask may be generated based at least in part on the refined mask by eliminating any kissing vessel connected with the aneurysm from the refined mask. The final mask may then be used for segmentation of the aneurysm and the parent vessel in the volumetric image data.

23 Claims, 12 Drawing Sheets

(56) References Cited

OTHER PUBLICATIONS

H Akhoondali, et al, "Rapid Automatic Segmentation and Visualization of Teeth in CT-Scan Data", Journal of Applied Sciences, vol. 9, No. 11, Jan. 1, 2009, pp. 2031-2044.
Wächter I. "3d reconstruction of cerebral blood flow and vessel morphology from x-ray rotational angiography"; Jan. 1, 2009 (Jan. 1, 2009), XP055497582; Retrieved from the Internet: URL:https://core.ac.uk/download/pdf/1685199.pdf.

* cited by examiner

ISOLATION OF ANEURYSM AND PARENT VESSEL IN VOLUMETRIC IMAGE DATA

TECHNICAL FIELD

The present disclosure generally relates to digital image data processing, and more particularly to isolation of aneurysm and its parent vessel in volumetric image data.

BACKGROUND

An aneurysm is a localized, blood-filled dilation or bulge of a blood vessel caused by disease or weakening of the vessel wall. Aneurysms can occur anywhere where there are blood vessels, although they are most common in arteries. Aneurysms most commonly occur in arteries at the base of the brain, in the circle of Willis and in the aorta. Rupture and blood clotting are the risks involved with aneurysms. Particularly, if the patient has elevated blood pressure, this bulge in the blood vessel can burst and lead to hemorrhage and possibly death at any time. The risk of death is high except for rupture in the extremities. The larger an aneurysm becomes, the more likely it is to burst.

X-ray C-arms are routinely used in medicine to acquire three-dimensional (3D) digital images for diagnostic assessment, and for guidance of interventional therapeutic procedures such as stent placement or coiling of aneurysms. Aneurysm analysis performed in 3D image space is often affected by the limitations of the aneurysm segmentation technique. In complicated aneurysm cases, the detection of aneurysm is not 100% accurate. This causes incomplete aneurysm detection, or aneurysm overflow (leak) outside the region of interest, which further results in inaccurate measurements.

FIG. 1 shows examples of aneurysm segmentation leak generated by a traditional segmentation technique. The gray portions 102a-h in the images represent the aneurysm detected by the segmentation technique. As shown, the aneurysm 102a-h has been detected incorrectly as leaking (or overflowing) to adjacent vessels outside the region of interest.

SUMMARY

Described herein is a framework for isolating an aneurysm and parent vessel in volumetric image data. In accordance with one aspect, the framework generates a refined mask by performing region growing starting at an aneurysm dome point to eliminate vessels that are indirectly connected to an aneurysm or parent vessel in volumetric image data. A final mask may be generated based at least in part on the refined mask by eliminating any kissing vessel from the refined mask. The final mask may then be used for segmenting the aneurysm and the parent vessel in the volumetric image data.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
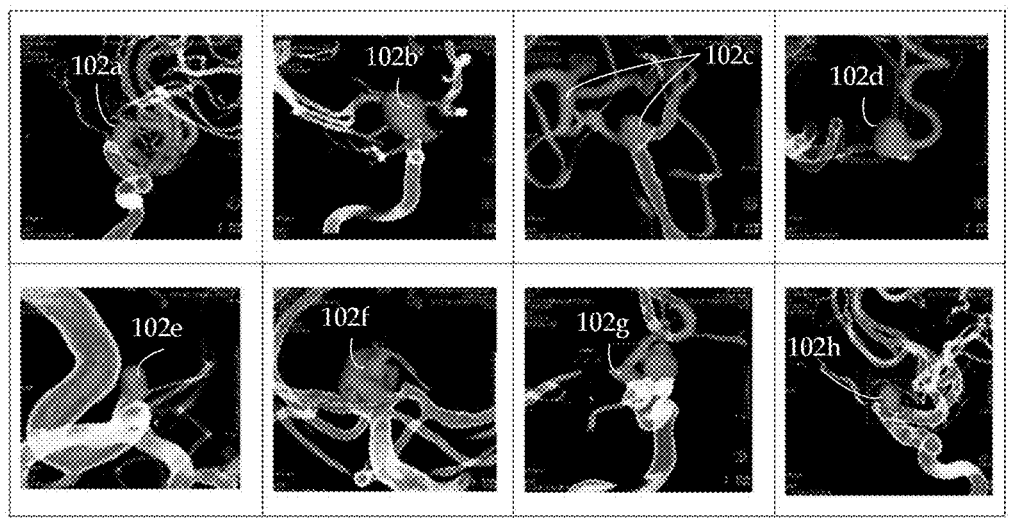
FIG. 1 shows examples of aneurysm segmentation leak generated by a traditional technique.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MM, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-Dimensional image, the domain of the image is typically a 2- or 3-Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displays as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

One aspect of the present framework isolates an aneurysm and its parent vessel in volumetric (or three-dimensional) image data. In some implementations, the framework starts by cleaning up the original input volumetric image data to remove vessels that are indirectly connected to the aneurysm or to the parent vessels. The clean-up may be performed using a region growing technique starting from an aneurysm dome point. Once the input image data is cleaned up, a final version of the volume mask is generated. This final mask contains only the aneurysm dome and parent vessel along the centerline.

Advantageously, the final mask does not contain any "kissing vessel" artifact. A "kissing vessel" as used herein generally refers to any unwanted artifact that appears to be a vessel touching or connected to the aneurysm in the mask, but is actually not a vessel where the aneurysm originated. The final mask may be passed to an aneurysm segmentation unit. The aneurysm segmentation unit runs on a cleaner version of input mask that does not contain any kissing vessels. As a result, the aneurysm segmentation unit generates segmentation results that are much more accurate and shows minimal amount of leak outside the actual aneurysm. These and other exemplary advantages and features will be described in more detail in the following description.

Figure 2:
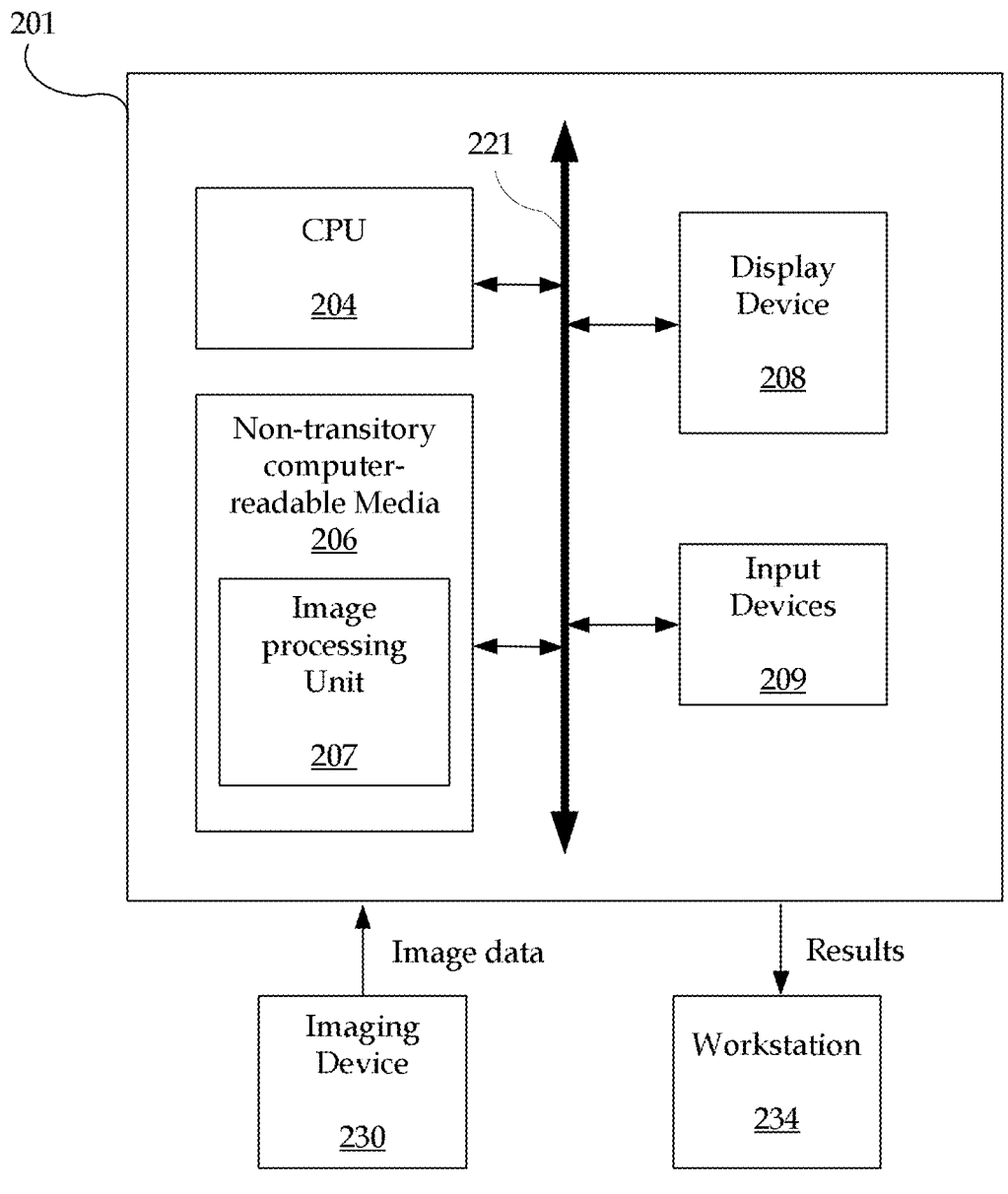
FIG. 2 is a block diagram illustrating an exemplary system.

FIG. 2 is a block diagram illustrating an exemplary system 200. The system 200 includes a computer system 201 for implementing the framework as described herein. In some implementations, computer system 201 operates as a standalone device. In other implementations, computer system 201 may be connected (e.g., using a network) to other machines, such as imaging device 230 and workstation 234. In a networked deployment, computer system 201 may operate in the capacity of a server (e.g., thin-client server, such as syngo® by Siemens Healthcare), a client user machine in server-client user network environment, or as a peer machine in a peer-to-peer (or distributed) network environment.

In one implementation, computer system 201 comprises a processor device or central processing unit (CPU) 204 coupled to one or more non-transitory computer-readable media 206 (e.g., computer storage or memory device), display device 208 (e.g., monitor) and various input devices 209 (e.g., mouse, touchpad or keyboard) via an input-output interface 221. Computer system 201 may further include support circuits such as a cache, a power supply, clock circuits and a communications bus. Various other peripheral devices, such as additional data storage devices and printing devices, may also be connected to the computer system 201.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 206. In particular, the present techniques may be implemented by a image processing unit 207. Non-transitory computer-readable media 206 may include random access memory (RAM), read-only memory (ROM), magnetic floppy disk, flash memory, and other types of memories, or a combination thereof. The computer-readable program code is executed by CPU 204 to process data acquired by, for example, imaging device 230. As such, the computer system 201 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 206 may be used for storing image datasets, knowledge base, individual patient data, database of previously treated patients (e.g., training data), and so forth. Such data may also be stored in external storage or other memories. The external storage may be implemented using a database management system (DBMS) managed by the CPU 204 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 230 may be a radiology scanner, such as an X-ray or a CT scanner, for acquiring image data. The imaging device 230 may be, for example, a flat-panel based X-ray scanner that includes at least one pair of X-ray source and X-ray detector. Alternatively, the imaging device 230 may include a rotating CT gantry covering at least one pair of X-ray source and X-ray detector. In other implementations, the imaging device 230 is an MR projection scanner. In yet other implementations, the imaging device 230 is a rotating optical CT gantry covering at least one pair of light source and optical detector. Other types of imaging device 230, such as angular sampling ultrasound, may also be used.

The workstation 234 may include a computer and appropriate peripherals, such as a keyboard and display device, and can be operated in conjunction with the entire system 200. For example, the workstation 234 may communicate with the imaging device 230 so that the image data collected by the imaging device 230 can be rendered at the workstation 234 and viewed on a display device. The workstation 234 may communicate directly with the computer system 201 to display processed image data and/or output image processing results. The workstation 234 may include a graphical user interface to receive user input via an input device (e.g., keyboard, mouse, touch screen voice or video recognition interface, etc.) to manipulate visualization and/or processing of the image data.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 3:
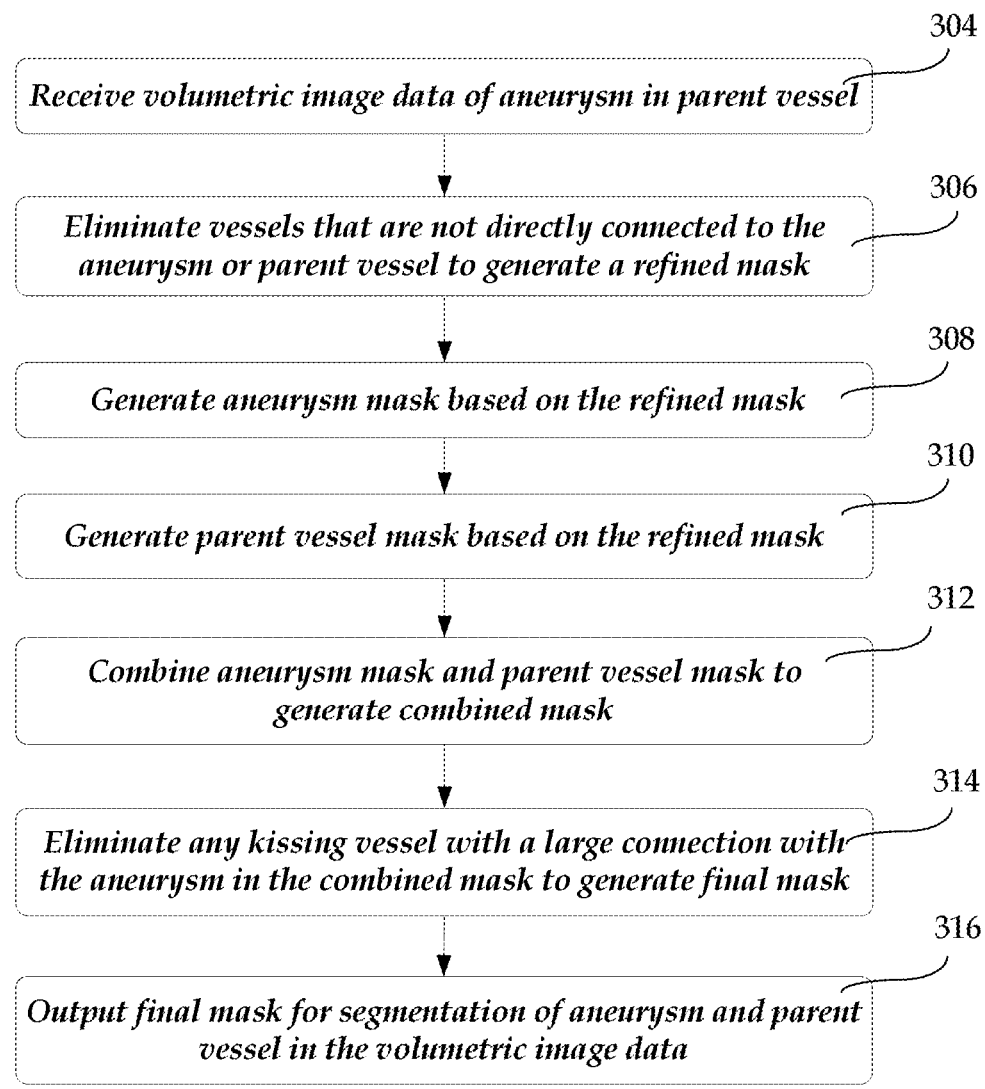
FIG. 3 shows an exemplary method performed by a computer system.

FIG. 3 shows an exemplary method 300 performed by a computer system. It should be understood that the steps of the method 300 may be performed in the order shown or a different order. Additional, different, or fewer steps may also be provided. Further, the method 300 may be implemented with the system 200 of FIG. 2, a different system, or a combination thereof.

At 304, image processing unit 207 receives volumetric (3D) image data of an aneurysm in a parent vessel. The volumetric image data may be generated by, for example, digital subtraction angiography (DSA) based on raw images acquired by imaging device 230. The aneurysm is located in the parent vessel, and can be filled with a contrast agent or medium for observing its propagation over time. The parent vessel may be found in, for example, a patient's or subject's brain, heart, leg, arm, and so forth. For example, the parent vessel may be a cerebral vascular structure containing a cerebral aneurysm. The volumetric image data may include other vessels that are indirectly connected to the parent vessel.

At 306, image processing unit 207 eliminates vessels that are indirectly connected to the aneurysm or parent vessel to generate a refined mask. In some implementations, image processing unit 207 eliminates the unconnected vessels by performing region growing starting at an aneurysm dome point. The aneurysm dome point is any point on or inside the rounded surface of an unruptured aneurysm. Image processing unit 207 may enable selection of the aneurysm dome point in the volumetric image data via a user interface presented at workstation 234.

Region growing may be performed radially starting from the selected aneurysm dome point towards the surface of a sphere centered at the aneurysm dome point. Region growing may be terminated in response to reaching the extents of a predefined bounding box, or if foreground (or non-background) voxels cannot be found in the immediate neighborhood, whichever comes first. The extents of the bounding box may be defined by the aneurysm dome point and two centerline end points plus a predetermined offset (e.g., 20%). Region growing occurs only for foreground (or non-background) voxels that have intensity values greater than or equal to the currently predefined threshold. For each valid foreground voxel, neighboring voxels may be grown around it (e.g., 26 neighboring voxels in a 3×3×3 neighborhood). Region growing for each voxel stops if at least one neighboring voxel is a background (or invalid) voxel with intensity value less than the currently predefined threshold. This helps to direct region growing towards voxels that have valid intensity values and are connected, and filters out (or invalidates) voxels representing vessel parts that are not connected. The region growing process outputs a refined mask that contains the aneurysm, parent vessel and all immediately connected vessels.

Figure 4A:
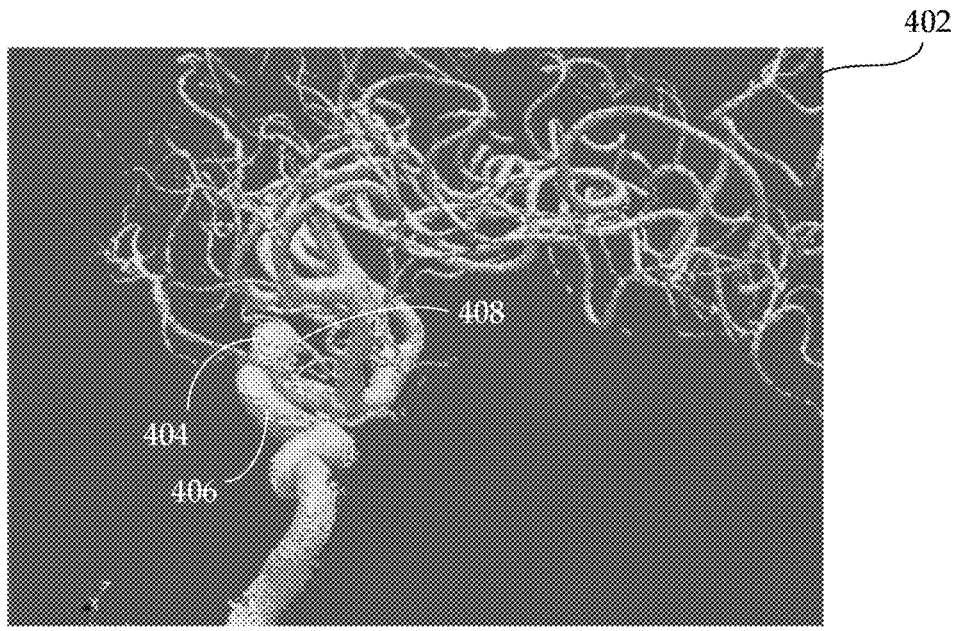
FIG. 4a shows an exemplary original volume mask.
Figure 4B:
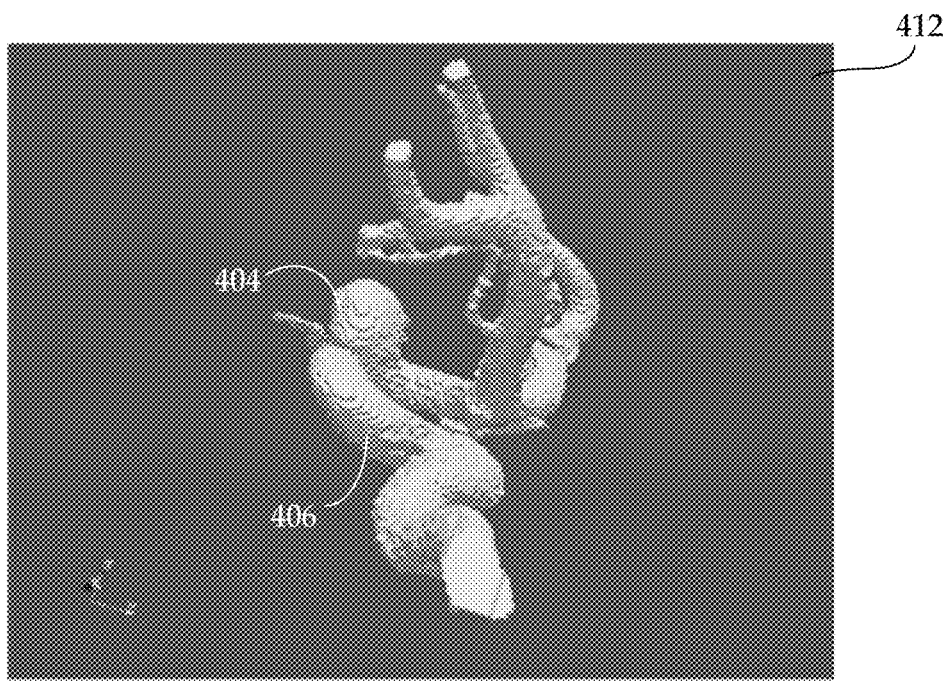
FIG. 4b shows an exemplary refined volume mask generated by the region growing process.

FIG. 4a shows an exemplary original volume mask 402. The volume mask includes the aneurysm 404 in the parent vessel 406 and kissing vessel 408. FIG. 4b shows an exemplary refined volume mask 412 generated by the region growing process. The refined volume mask 412 includes only the aneurysm 404 and the parent vessel 406. Vessels that are not connected to the aneurysm 404 and the parent vessel 406 have been removed. However, a kissing vessel (not shown) may still appear in the refined volume mask 412 in some cases.

Returning to FIG. 3, at 308, image processing unit 207 generates an aneurysm mask based on the refined mask. The aneurysm mask contains only the aneurysm portion of the volumetric image data. Voxels that represent the aneurysm portion are saved as foreground values in the aneurysm mask, while voxels that do not represent the aneurysm portion are set to background values.

Figure 5:
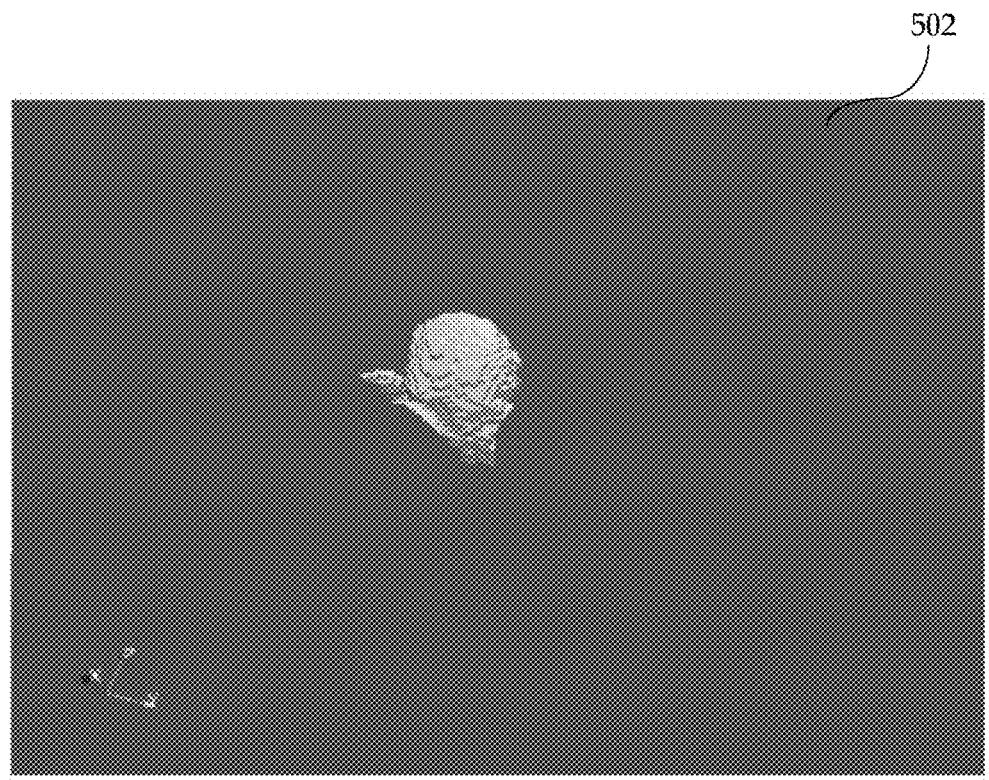
FIG. 5 shows an exemplary aneurysm mask.

FIG. 5 shows an exemplary aneurysm mask 502. The aneurysm mask may be generated by checking each voxel of the refined mask to ensure there is a connected straight path from the voxel to the aneurysm dome point. More particularly, for each test voxel of the refined mask, a ray is generated from the voxel to the aneurysm dome point. If the ray from the test voxel hits the dome point without hitting a background voxel, the test voxel is saved as a foreground (or valid) voxel in the aneurysm mask. If the ray hits a background voxel before hitting the aneurysm dome point, the test voxel is marked as a background (or invalid) voxel in the aneurysm mask. This test eliminates a majority or all voxels that are not part of the aneurysm.

Returning to FIG. 3, at 310, image processing unit 207 generates a parent vessel mask based on the refined mask. The parent vessel mask contains only the parent vessel portion of the volumetric data. Voxels that represent the parent vessel portion are saved as foreground values in the parent vessel mask, while voxels that do not represent the parent vessel portion are set to background values.

Figure 6:
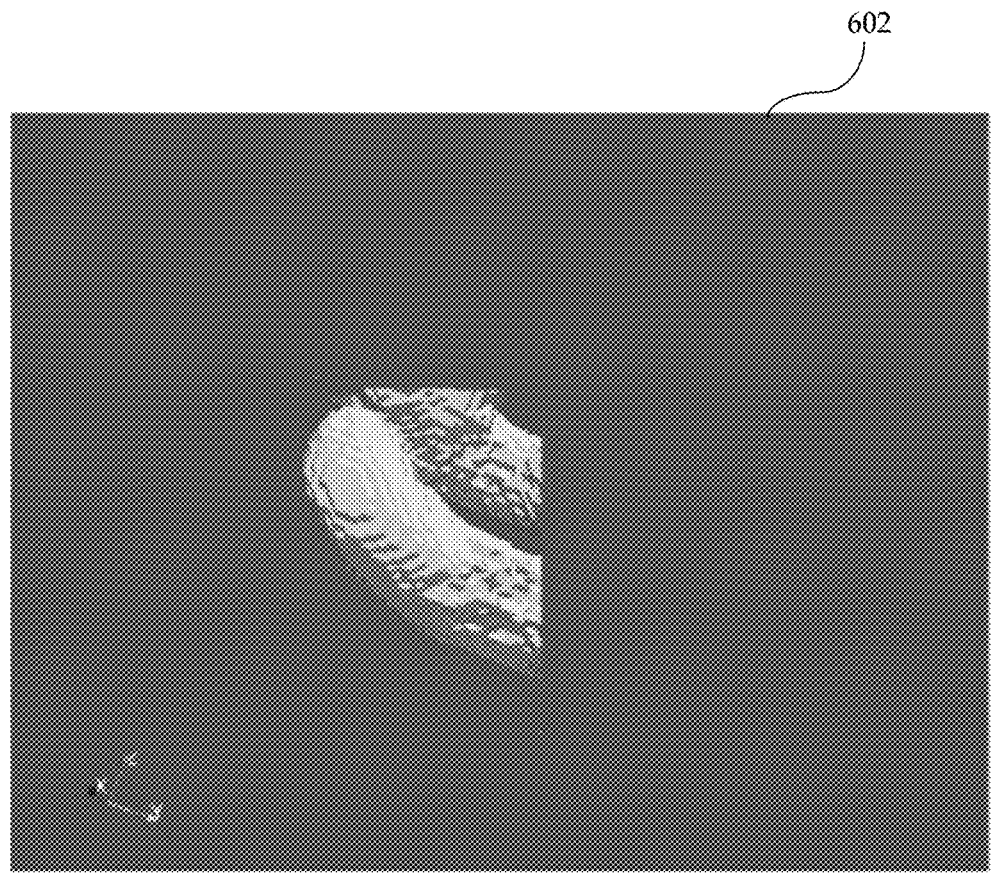
FIG. 6 shows an exemplary parent vessel mask.

FIG. 6 shows an exemplary parent vessel mask 602. The parent vessel mask may be generated by checking each voxel of the refined mask to ensure there is a connected straight path from a centerline point of the parent vessel to generate a parent vessel mask. More particularly, for each test voxel of the refined mask, rays are generated from the voxel to all centerline points of the parent vessel. If the ray from the test voxel hits the centerline points without hitting a background voxel, the test voxel is saved as foreground voxels in the parent vessel mask. If the ray hits a background voxel before hitting the centerline points, the test voxel is marked as a background voxel in the parent vessel mask. This test eliminates a majority or all voxels that are not part of the parent vessel.

Figure 7:
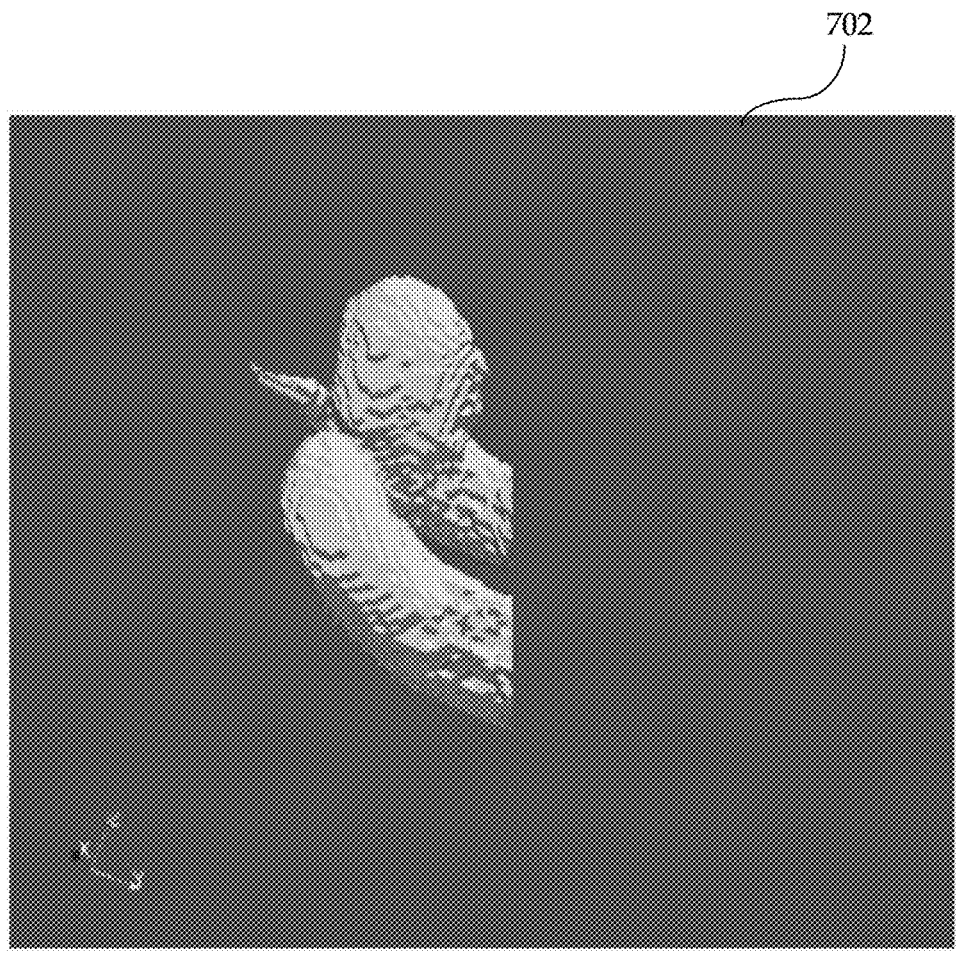
FIG. 7 shows an exemplary combined mask.

Returning to FIG. 3, at 312, image processing unit 207 combines the aneurysm mask and the parent vessel mask to generate a combined mask. The aneurysm and parent vessel masks may be combined by marking a voxel at a particular voxel location in the combined mask as foreground (or valid) if the voxel at the same location in either the aneurysm mask or parent vessel mask is marked as foreground. By combining the aneurysm mask and parent vessel mask, a combined mask that contains both aneurysm and part of parent vessel is obtained. FIG. 7 shows an exemplary combined mask 702.

Returning to FIG. 3, at 314, image processing unit 207 eliminates any kissing vessel with a large connection with the aneurysm in the combined mask. Kissing vessels with small connection (e.g., 2 voxels wide) with the aneurysm are eliminated by the cleanup performed in previous steps. However, some kissing vessels have large connections (e.g., >5 voxels) with the aneurysm. To remove such large connection kissing vessel, a 'crown' detection and elimination process may be performed. The 'crown' refers to the edge of the kissing vessel that makes a crown shape with the aneurysm. Such 'crown' shape information may be used to erase the kissing vessel portion from the aneurysm surface. The 'crown' may be detected by finding all voxels that do not have a straight path connection to the aneurysm dome point, but have a neighbor that does. These clusters of invalid voxels mark the edge of possible kissing vessels, and are removed from the mask.

Figure 8:
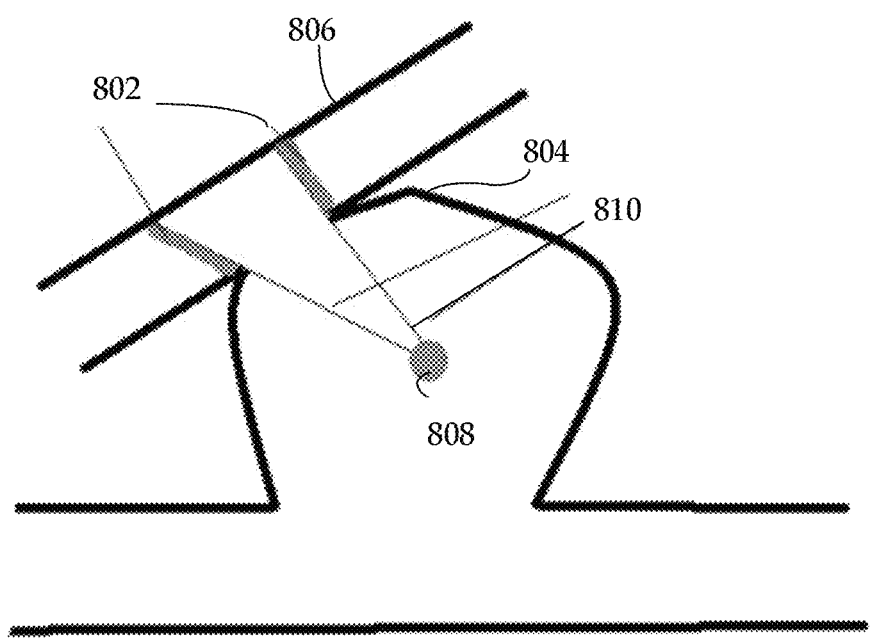
FIG. 8 shows an exemplary 'crown'.

FIG. 8 shows an exemplary "crown" 802. The "crown" 802 is a cluster of invalid voxels with valid neighbors that are detected between an aneurysm 804 and a kissing vessel 806. Rays 810 from the aneurysm dome point 808 may be generated to check for the invalid voxels in the combined mask.

Figures 9A, 9B, 9C:
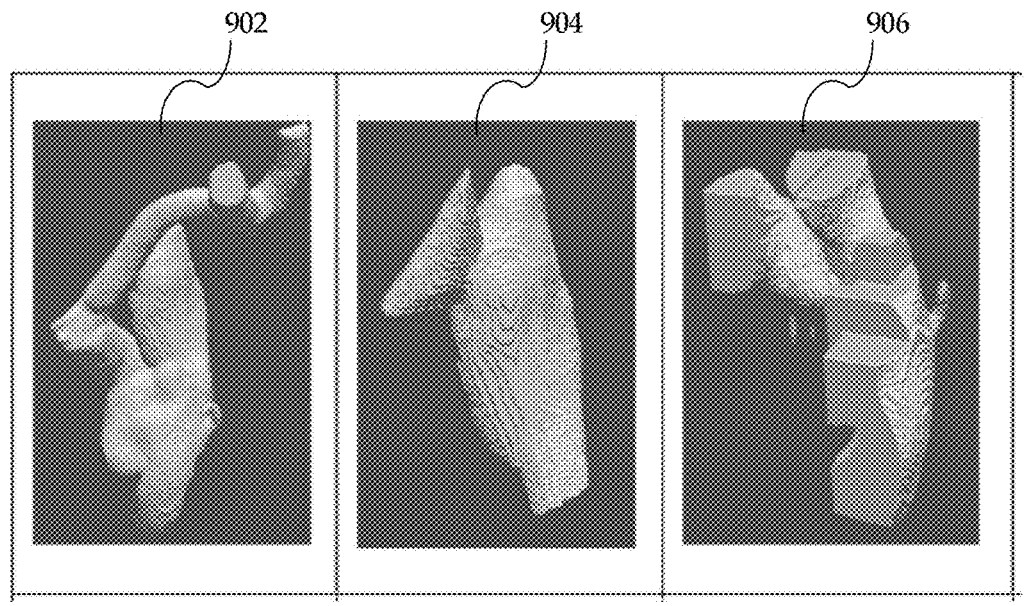
FIGS. 9a-f illustrate the steps for cleaning up the mask.
Figures 9D, 9E, 9F:
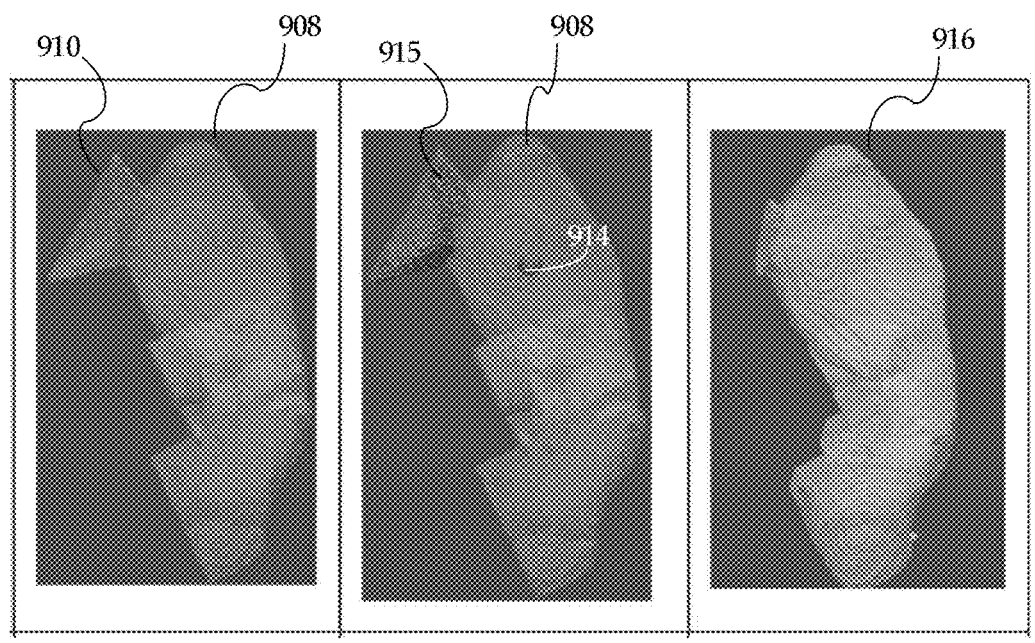

FIGS. 9a-f illustrate the steps for cleaning up the mask. More particularly, FIG. 9a shows an exemplary refined mask 902. FIG. 9b shows an exemplary aneurysm mask 904 generated based on the refined mask 902. FIG. 9c shows an exemplary parent vessel mask 906 generated based on the refined mask 902. FIG. 9d shows an exemplary combined mask 908 generated by combining the aneurysm mask 904 and parent vessel mask 906. The combined mask 908 still includes a portion (i.e., 'crown') of the kissing vessel 910.

FIG. 9e illustrates the detection of the crown 915. Rays are generated from the aneurysm dome point 914 in all directions through each voxel of the combined mask 908 to determine which voxels are directly hit (i.e., valid). Voxels that are indirectly hit by the rays but have a valid neighboring voxel are extracted as invalid voxels 915. The invalid voxels 915 look like a "crown", which indicates the border of the kissing vessel portion. The center point of this "crown" 915 is determined, and used with the dome point 914 to determine the borderline.

More particularly, an iterative process may be performed to determine the borderline of the kissing vessel and aneurysm surface. The iterative process starts with calculating the center point of the "crown" 915. A cut plane is determined based on the direction from the center point to the aneurysm dome point. The cut plane is orthogonal to that direction. The number of crown points that are on either side of the cut plane is determined. If the percentage of crown points that are above (or on the side of the cut plane further away from the aneurysm dome point) is more than or equal to a predetermined threshold value (e.g., >90%), then the cut plane is assigned as the borderline and the iterative process stops. If not, the center point is moved towards the aneurysm point by a predetermined distance to generate a new center point, and the cut plane is recalculated based on the new center point. All voxels that lie above the borderline are marked as background voxels (i.e., removed) to generate a final mask 916, as shown in FIG. 9f. The final mask 916 does not contain the 'crown' or border of the kissing vessel portion 910.

Figure 10A:
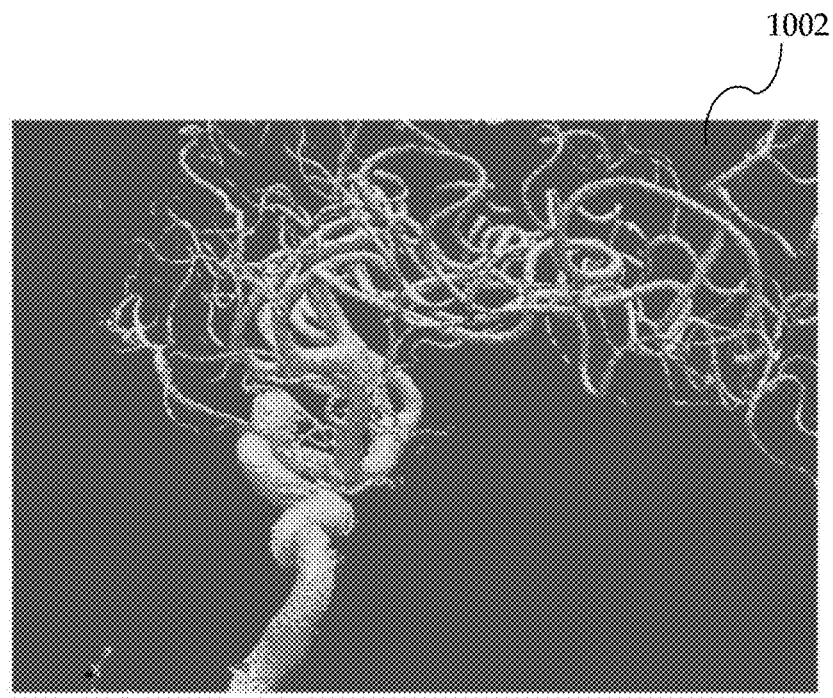
FIG. 10a shows an exemplary original volumetric image data.
Figure 10B:
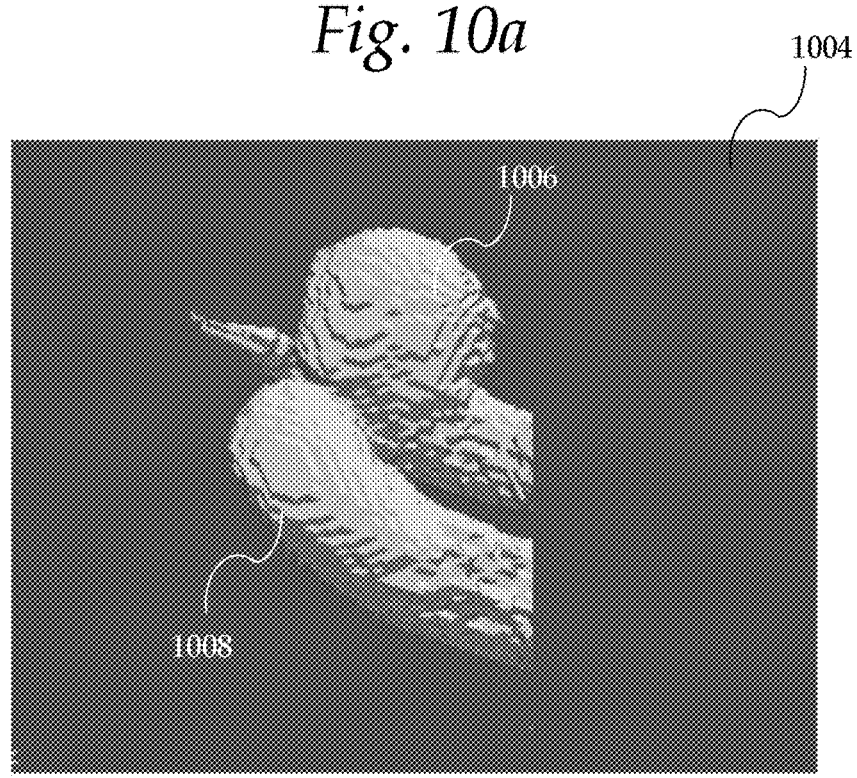
FIG. 10b shows the final output mask generated after performing the previous clean up steps.

FIG. 10a shows an exemplary original volumetric image data 1002. FIG. 10b shows the final output mask 1004 generated after performing the previous clean up steps. The final output mask contains only the aneurysm dome 1006 and the parent vessel 1008. Small and large kissing vessels were removed from the volumetric image data.

Returning to FIG. 3, at 316, image processing unit 207 outputs the final mask for segmentation of the aneurysm and the parent vessel. The final mask may be provided to a segmentation unit to perform the final segmentation of the volumetric image data.

Figure 11A:
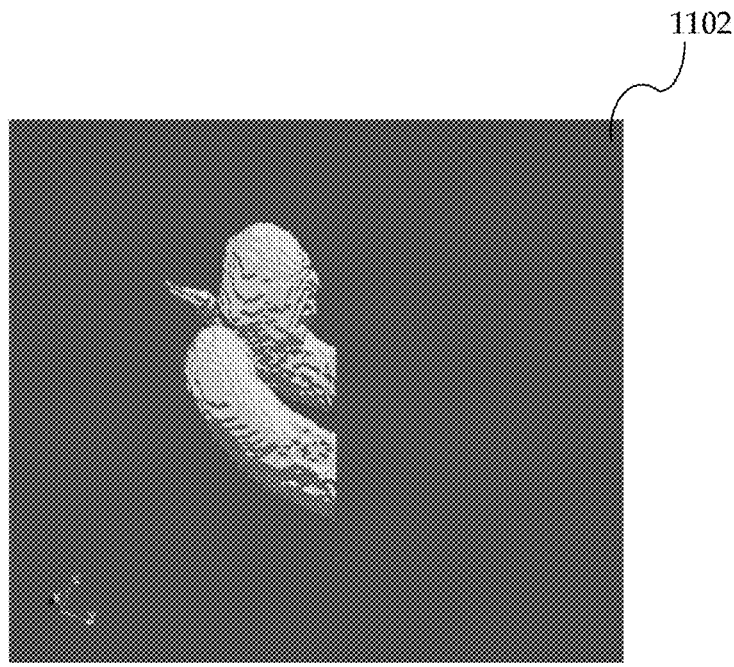
FIG. 11a shows an exemplary final mask.
Figure 11B:
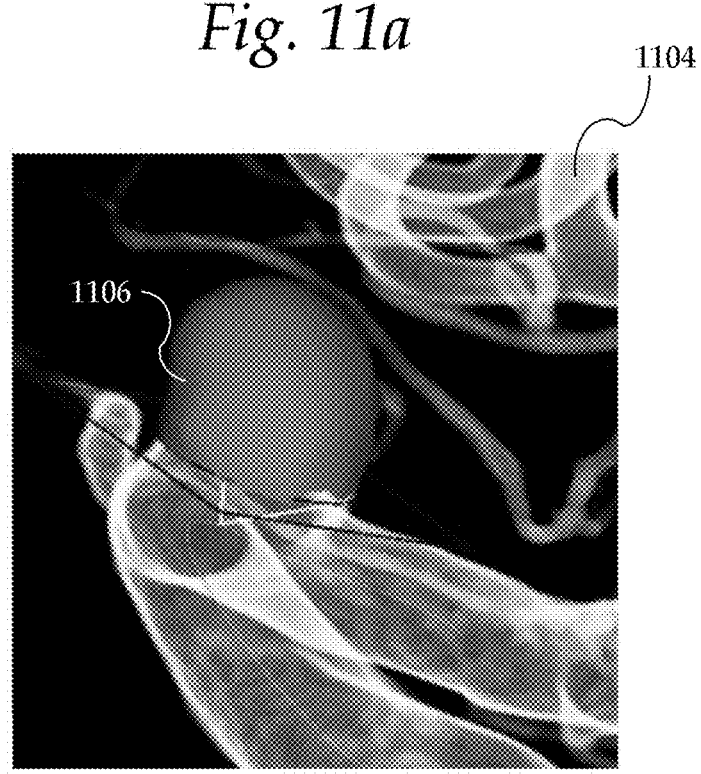
FIG. 11b shows an exemplary segmentation output.

FIG. 11a shows an exemplary final mask 1102. FIG. 11b shows an exemplary segmentation output 1104. As shown, the segmentation output 1104 is more accurate than those generated by traditional segmentation methods, and shows minimal leak outside the actual aneurysm 1106.

Figure 12A:
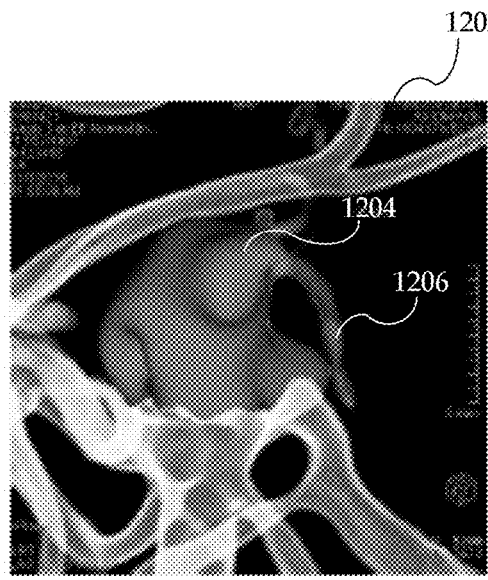
FIG. 12a shows an exemplary image generated by traditional segmentation methods.
Figure 12B:
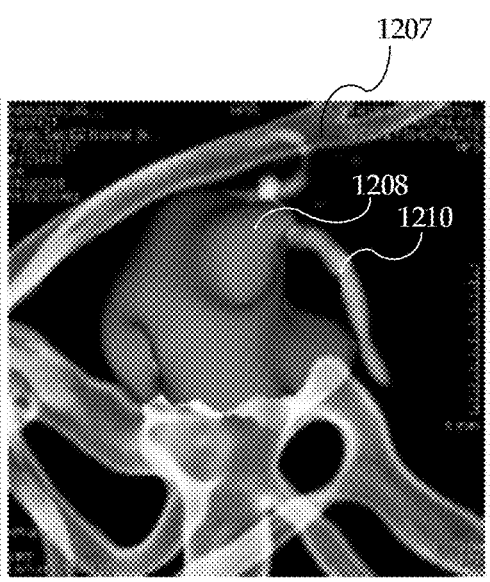
FIG. 12b shows an exemplary image generated by the present framework.

FIG. 12a shows an exemplary image 1202 generated by traditional segmentation methods. The segmented portions (1204, 1206) are shown in a uniform color (e.g., orange). As shown, the segmentation output includes both the aneurysm in the parent vessel 1204 as well as a neighboring kissing vessel 1206. FIG. 12b shows an exemplary image 1207 generated by the present framework described herein. The segmented portion 1208 includes only the actual aneurysm in the parent vessel, without leaking into the kissing vessel 1210.

Figure 13A:
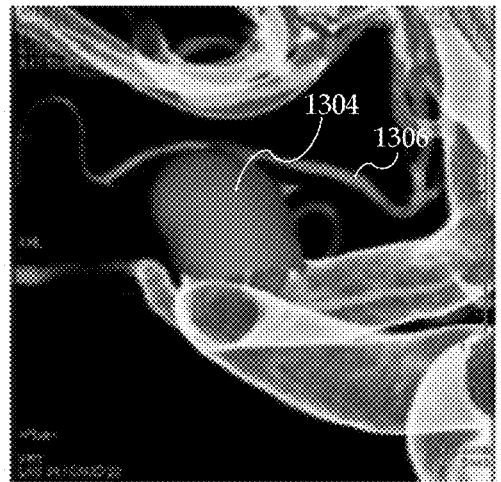
FIG. 13a shows another exemplary image generated by traditional segmentation methods.
Figure 13B:
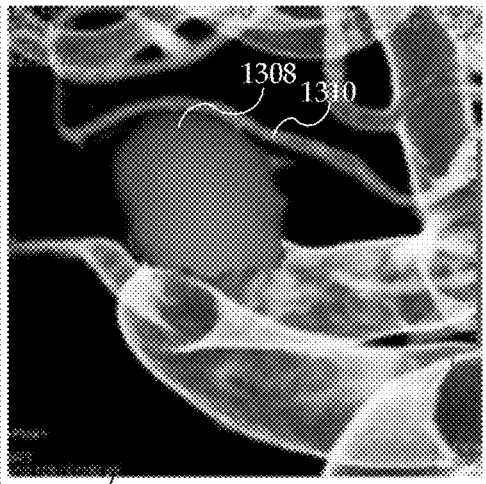
FIG. 13b shows another exemplary image generated by the present framework.

FIG. 13a shows another exemplary image 1302 generated by traditional segmentation methods. The segmented portions (1304, 1306) are shown in a uniform color (e.g., orange). As shown, the segmentation output includes both the aneurysm in the parent vessel 1304 as well as a neighboring kissing vessel 1306. FIG. 13b shows another exemplary image 1307 generated by the present framework described herein. The segmented portion 1308 is more accurate, and includes only the actual aneurysm in the parent vessel, without leaking into the kissing vessel 1310.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for image processing, comprising:
 a non-transitory memory device for storing computer readable program code; and
 a processor device in communication with the memory device, the processor being operative with the computer readable program code to perform steps including
  generating a refined mask by eliminating vessels that are indirectly connected to an aneurysm or parent vessel in volumetric image data,
  generating an aneurysm mask based on the refined mask by
   for each voxel of the refined mask, generating a ray from the voxel to an aneurysm dome point,
   in response to the ray hitting the aneurysm dome point without hitting a background voxel in the refined mask, saving the voxel as a foreground voxel in the aneurysm mask, and
   in response to the ray hitting the aneurysm dome point after hitting the background voxel in the refined mask, marking the voxel as a background voxel in the aneurysm mask,
  generating a parent vessel mask based on the refined mask,
  combining the aneurysm mask and the parent vessel mask to generate a combined mask, and
  generating, based on the combined mask, a final mask for image segmentation.

2. The system of claim 1 wherein the volumetric image data comprises digital subtraction angiography image data.

3. The system of claim 1 wherein the processor is operative with the computer readable program code to generate the refined mask by performing region growing starting at the aneurysm dome point.

4. The system of claim 1 wherein the processor is operative with the computer readable program code to generate the parent vessel mask by
 for each voxel of the refined mask, generating a ray from the voxel to a centerline point of the parent vessel,
 in response to the ray hitting the centerline point without hitting a background voxel in the refined mask, saving the voxel as a foreground voxel in the parent vessel mask, and
 in response to the ray hitting the centerline point after hitting the background voxel in the refined mask, marking the voxel as a background voxel in the parent vessel mask.

5. The system of claim 1 wherein the processor is operative with the computer readable program code to generate the final mask by eliminating any kissing vessel with large connection with the aneurysm in the combined mask.

6. The system of claim 1 wherein the processor is operative with the computer readable program code to generate the final mask by
 generating rays from the aneurysm dome point in all directions through voxels of the combined mask,
 extracting as invalid voxels any of the voxels not being directly hit by at least one of the rays and having a valid neighboring voxel,
 determining a center point of the invalid voxels,
 determining a borderline of a kissing vessel based on the center point and the aneurysm dome point, and
 marking voxels above the borderline as background voxels to generate the final mask.

7. A computer-implemented method, comprising:
 generating a refined mask by performing region growing starting at an aneurysm dome point to eliminate vessels that are indirectly connected to an aneurysm or parent vessel in volumetric image data;
 generating an aneurysm mask based on the refined mask;
 generating a parent vessel mask based on the refined mask;
 combining the aneurysm mask and the parent vessel mask to generate a combined mask;
 generating a final mask based on the combined mask and at least in part on the refined mask by eliminating any kissing vessel connected with the aneurysm; and
 outputting the final mask for segmentation of the aneurysm and the parent vessel in the volumetric image data,
 wherein generating the aneurysm mask comprises:
  for each voxel of the refined mask, generating a ray from the voxel to an aneurysm dome point;
  in response to the ray hitting the aneurysm dome point without hitting a background voxel in the refined mask, saving the voxel as a foreground voxel in the aneurysm mask; and
  in response to the ray hitting the aneurysm dome point after hitting the background voxel in the refined mask, marking the voxel as a background voxel in the aneurysm mask.

8. The method of claim 7 wherein generating the refined mask comprises performing region growing starting at the aneurysm dome point.

9. The method of claim 8 wherein performing the region growing comprises performing the region growing outwards radially starting from the aneurysm dome point towards a surface of a sphere until bounds of a predefined bounding box is reached.

10. The method of claim 8 wherein performing the region growing comprises performing the region growing until extents of a predefined bounding box are reached.

11. The method of claim 8 wherein preforming the region growing comprises performing the region growing until foreground voxels cannot be found in an immediate neighborhood.

12. The method of claim 7 wherein generating the parent vessel mask comprises:
 for each voxel of the refined mask, generating a ray from the voxel to a centerline point of the parent vessel;
 in response to the ray hitting the centerline point without hitting a background voxel in the refined mask, saving the voxel as a foreground voxel in the parent vessel mask; and
 in response to the ray hitting the centerline point after hitting the background voxel in the refined mask, marking the voxel as a background voxel in the parent vessel mask.

13. The method of claim 12 wherein generating the ray comprises generating multiple rays from the voxel to multiple centerline points of the parent vessel.

14. The method of claim 7 wherein combining the aneurysm mask and the parent vessel mask to generate the combined mask comprises marking a voxel at a particular voxel location in the combined mask as foreground if the voxel at the same location in either the aneurysm mask or the parent vessel mask is marked as foreground.

15. The method of claim 7 wherein generating the final mask comprises:
   generating rays from the aneurysm dome point in all directions through voxels of the combined mask;
   extracting as invalid voxels any of the voxels not being directly hit by at least one of the rays and having a valid neighboring voxel;
   determining a center point of the invalid voxels;
   determining a borderline of a kissing vessel based on the center point and the aneurysm dome point; and
   marking voxels above the borderline as background voxels in the final mask.

16. The method of claim 15 wherein determining the borderline of the kissing vessel comprises:
   (i) determining a cut plane based on a direction from the center point to the aneurysm dome point, wherein the cut plane is orthogonal to the direction;
   (ii) determining a number of the invalid voxels on either side of the cut plane;
   (iii) in response to a percentage of the number of invalid voxels above the cut plane being less than a predetermined threshold value, moving the center point towards the aneurysm point by a predetermined distance to generate a new center point and repeating steps (i) through (iii) based on the new center point; and
   (iv) in response to the percentage of the number of invalid voxels above the cut plane being more than or equal to the predetermined threshold value, assigning the cut plane as the borderline.

17. One or more non-transitory computer readable media embodying a program of instructions executable by machine to perform steps comprising:
   generating a refined mask by performing region growing starting at an aneurysm dome point to eliminate vessels that are indirectly connected to an aneurysm or parent vessel in volumetric image data;
   generating an aneurysm mask based on the refined mask;
   generating a parent vessel mask based on the refined mask;
   combining the aneurysm mask and the parent vessel mask to generate a combined mask;
   generating a final mask based on the combined mask and at least in part on the refined mask by eliminating any kissing vessel connected with the aneurysm; and
   outputting the final mask for segmentation of the aneurysm and the parent vessel in the volumetric image data,
   wherein generating the aneurysm mask comprises:
      for each voxel of the refined mask, generating a ray from the voxel to an aneurysm dome point
      in response to the ray hitting the aneurysm dome point without hitting a background voxel in the refined mask, saving the voxel as a foreground voxel in the aneurysm mask; and
      in response to the ray hitting the aneurysm dome point after hitting the background voxel in the refined mask, marking the voxel as a background voxel in the aneurysm mask.

18. A system for image processing, comprising:
   a non-transitory memory device for storing computer readable program code; and
   a processor device in communication with the memory device, the processor being operative with the computer readable program code to perform steps including
      generating a refined mask by eliminating vessels that are indirectly connected to an aneurysm or parent vessel in volumetric image data,
      generating an aneurysm mask based on the refined mask,
      generating a parent vessel mask based on the refined mask by
         for each voxel of the refined mask, generating a ray from the voxel to a centerline point of the parent vessel,
         in response to the ray hitting the centerline point without hitting a background voxel in the refined mask, saving the voxel as a foreground voxel in the parent vessel mask, and
         in response to the ray hitting the centerline point after hitting the background voxel in the refined mask, marking the voxel as a background voxel in the parent vessel mask,
      combining the aneurysm mask and the parent vessel mask to generate a combined mask, and
      generating, based on the combined mask, a final mask for image segmentation.

19. A system for image processing, comprising:
   a non-transitory memory device for storing computer readable program code; and
   a processor device in communication with the memory device, the processor being operative with the computer readable program code to perform steps including
      generating a refined mask by eliminating vessels that are indirectly connected to an aneurysm or parent vessel in volumetric image data,
      generating an aneurysm mask based on the refined mask,
      generating a parent vessel mask based on the refined mask,
      combining the aneurysm mask and the parent vessel mask to generate a combined mask, and
      generating, based on the combined mask, a final mask for image segmentation by
         generating rays from an aneurysm dome point in all directions through voxels of the combined mask,
         extracting as invalid voxels any of the voxels not being directly hit by at least one of the rays and having a valid neighboring voxel,
         determining a center point of the invalid voxels,
         determining a borderline of a kissing vessel based on the center point and the aneurysm dome point, and
         marking voxels above the borderline as background voxels to generate the final mask.

20. A computer-implemented method, comprising:
   generating a refined mask by performing region growing starting at an aneurysm dome point to eliminate vessels that are indirectly connected to an aneurysm or parent vessel in volumetric image data;
   generating an aneurysm mask based on the refined mask;
   generating a parent vessel mask based on the refined mask;
   combining the aneurysm mask and the parent vessel mask to generate a combined mask;
   generating a final mask based on the combined mask and at least in part on the refined mask by eliminating any kissing vessel connected with the aneurysm; and outputting the final mask for segmentation of the aneurysm and the parent vessel in the volumetric image data, wherein generating the parent vessel mask comprises:
for each voxel of the refined mask, generating a ray from the voxel to a centerline point of the parent vessel;
in response to the ray hitting the centerline point without hitting a background voxel in the refined mask, saving the voxel as a foreground voxel in the parent vessel mask; and
in response to the ray hitting the centerline point after hitting the background voxel in the refined mask, marking the voxel as a background voxel in the parent vessel mask.

21. The method of claim 20 wherein generating the ray comprises generating multiple rays from the voxel to multiple centerline points of the parent vessel.

22. A computer-implemented method, comprising:
generating a refined mask by performing region growing starting at an aneurysm dome point to eliminate vessels that are indirectly connected to an aneurysm or parent vessel in volumetric image data;
generating an aneurysm mask based on the refined mask;
generating a parent vessel mask based on the refined mask;
combining the aneurysm mask and the parent vessel mask to generate a combined mask;
generating a final mask based on the combined mask and at least in part on the refined mask by eliminating any kissing vessel connected with the aneurysm; and
outputting the final mask for segmentation of the aneurysm and the parent vessel in the volumetric image data, wherein generating the final mask comprises:
generating rays from the aneurysm dome point in all directions through voxels of the combined mask;
extracting as invalid voxels any of the voxels not being directly hit by at least one of the rays and having a valid neighboring voxel;
determining a center point of the invalid voxels;
determining a borderline of a kissing vessel based on the center point and the aneurysm dome point; and
marking voxels above the borderline as background voxels in the final mask.

23. The method of claim 22 wherein determining the borderline of the kissing vessel comprises:
determining a cut plane based on a direction from the center point to the aneurysm dome point, wherein the cut plane is orthogonal to the direction;
(ii) determining a number of the invalid voxels on either side of the cut plane;
(iii) in response to a percentage of the number of invalid voxels above the cut plane being less than a predetermined threshold value, moving the center point towards the aneurysm point by a predetermined distance to generate a new center point and repeating steps (i) through (iii) based on the new center point; and
(iv) in response to the percentage of the number of invalid voxels above the cut plane being more than or equal to the predetermined threshold value, assigning the cut plane as the borderline.

* * * * *